United States Patent
Wang et al.

(10) Patent No.: US 12,131,407 B2
(45) Date of Patent: Oct. 29, 2024

(54) METHOD, DEVICE, AND COMPUTER PROGRAM PRODUCT FOR GENERATING VIRTUAL IMAGE

(71) Applicant: Dell Products L.P., Round Rock, TX (US)

(72) Inventors: Zijia Wang, WeiFang (CN); Jiacheng Ni, Shanghai (CN); Jinpeng Liu, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 351 days.

(21) Appl. No.: 17/687,943

(22) Filed: Mar. 7, 2022

(65) Prior Publication Data
US 2023/0237713 A1      Jul. 27, 2023

(30) Foreign Application Priority Data
Jan. 21, 2022   (CN) .......................... 202210074406.9

(51) Int. Cl.
*G06T 11/00*     (2006.01)
*G06N 3/08*      (2023.01)
*G06T 19/20*     (2011.01)

(52) U.S. Cl.
CPC ............. *G06T 11/001* (2013.01); *G06N 3/08* (2013.01); *G06T 19/20* (2013.01); *G06T 2219/2021* (2013.01)

(58) Field of Classification Search
None
See application file for complete search history.

(56) References Cited

U.S. PATENT DOCUMENTS

2022/0207326 A1*  6/2022  Zaker Habibabadi ...................... G06N 3/045

FOREIGN PATENT DOCUMENTS

WO   WO-2021155140 A1 *  8/2021  ........... G06T 13/205

OTHER PUBLICATIONS

Yi, Ran, et al. "Audio-driven talking face video generation with learning-based personalized head pose." arXiv preprint arXiv: 2002.10137 (Year: 2020).*
J. Liu et al., "OPT: Omni-Perception Pre-Trainer for Cross-Modal Understanding and Generation," arXiv:2107.00249v2, Jul. 6, 2021, 10 pages.

(Continued)

*Primary Examiner* — Sarah Le
(74) *Attorney, Agent, or Firm* — Ryan, Mason & Lewis, LLP

(57) ABSTRACT

Embodiments of the present disclosure relate to a method, an electronic device, and a computer program product for generating a virtual image. The method includes extracting an audio feature of an audio input of a target object; and acquiring an expression parameter and a pose parameter associated with the target object based on the audio feature. The method further includes generating, based on the audio feature, auxiliary information related to a texture for at least a portion of the target object and a geometric shape of at least a portion of the target object. The method further includes generating a virtual image of the target object based on the expression parameter, the pose parameter, and the auxiliary information.

20 Claims, 6 Drawing Sheets

(56) References Cited

OTHER PUBLICATIONS

G. Gafni et al., "Dynamic Neural Radiance Fields for Monocular 4D Facial Avatar Reconstruction," arXiv:2012.03065v1, Dec. 5, 2020, 11 pages.
U.S. Appl. No. 17/588,515 filed in the name of Zijia Wang et al. filed Jan. 31, 2022, and entitled "Method, Electronic Device, and Computer Program Product for Training Model."
U.S. Appl. No. 17/680,986 filed in the name of Zijia Wang et al. filed Feb. 25, 2022, and entitled "Method, Electronic Device, and Computer Program Product for Processing Data."

* cited by examiner

METHOD, DEVICE, AND COMPUTER PROGRAM PRODUCT FOR GENERATING VIRTUAL IMAGE

RELATED APPLICATION(S)

The present application claims priority to Chinese Patent Application No. 202210074406.9, filed Jan. 21, 2022, and entitled "Method, Device, and Computer Program Product for Generating Virtual Image," which is incorporated by reference herein in its entirety.

FIELD

Embodiments of the present disclosure relate to the field of computer information processing and, more specifically, to a method, an electronic device, and a computer program product for generating a virtual image based on audio information.

BACKGROUND

With the development of computer vision and communication technology, the generation of virtual images based on computer graphic (CG) modeling becomes more and more popular and is used in more and more scenarios. Existing virtual image generation approaches are all based on videos, so users need to be equipped with image capture devices. However, existing hardware devices, especially those required in scenarios that implement virtual image generation in combination with virtual reality (VR), augmented reality (AR), and mixed reality (MR), are expensive and very high in cost. In addition, large amounts of communication resources and computational resources are required when processing video streams, thereby also reducing the generation efficiency and increasing the computational cost of virtual images.

SUMMARY

Embodiments of the present disclosure provide a method, an electronic device, and a computer program product for generating a virtual image.

According to a first aspect of the present disclosure, a method for generating a virtual image is provided. The method includes extracting an audio feature of an audio input of a target object; and acquiring an expression parameter and a pose parameter associated with the target object based on the audio feature. The method further includes generating, based on the audio feature, auxiliary information related to a texture for at least a portion of the target object and a geometric shape of at least a portion of the target object. The method further includes generating a virtual image of the target object based on the expression parameter, the pose parameter, and the auxiliary information.

According to a second aspect of the present disclosure, an electronic device for generating a virtual image is provided. The electronic device includes at least one processor; and a memory coupled to the at least one processor and having instructions stored therein, wherein the instructions, when executed by the at least one processor, cause the device to perform actions including: extracting an audio feature of an audio input of a target object; acquiring an expression parameter and a pose parameter associated with the target object based on the audio feature; generating, based on the audio feature, auxiliary information related to a texture for at least a portion of the target object and a geometric shape of at least a portion of the target object; and generating a virtual image of the target object based on the expression parameter, the pose parameter, and the auxiliary information.

According to a third aspect of the present disclosure, a computer program product is provided, which is tangibly stored on a non-volatile computer-readable medium and includes machine-executable instructions, wherein the machine-executable instructions, when executed by a machine, cause the machine to perform steps of the method in the first aspect of the present disclosure.

BRIEF DESCRIPTION OF THE DRAWINGS

The above and other objectives, features, and advantages of the present disclosure will become more apparent from description herein of example embodiments of the present disclosure, with reference to the accompanying drawings, where identical reference numerals generally represent identical components in the example embodiments of the present disclosure.

In the drawings, identical or corresponding numerals represent identical or corresponding parts.

DETAILED DESCRIPTION

Example embodiments of the present disclosure will be described in more detail below with reference to the accompanying drawings. Although the drawings show some embodiments of the present disclosure, it should be understood that the present disclosure can be implemented in various forms, and should not be viewed as being limited to the embodiments disclosed herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

With the development of computer vision and communication technology, the generation of virtual images based on CG modeling becomes more and more popular and is used in more and more scenarios. Existing virtual image generation approaches are all based on videos, so users need to be equipped with image capture devices. However, existing hardware devices, especially those required in scenarios that implement virtual image generation in combination with VR, AR, and MR, are expensive and very high in cost. In addition, large amounts of communication resources and computational resources are required when processing video streams, thereby also reducing the generation efficiency and increasing the computational cost of virtual images.

At least to solve the above and other potential problems, embodiments of the present disclosure provide a method for generating a virtual image. In the method, an electronic device acquires an expression parameter and a pose parameter associated with a target object based on an audio input of the target object. The electronic device further generates, based on an audio feature of the audio input, auxiliary information related to a texture for at least a portion of the target object and a geometric shape of at least a portion of the target object. Then, the electronic device generates a virtual image of the target object based on the expression parameter, the pose parameter, and the auxiliary information.

Figure 1:
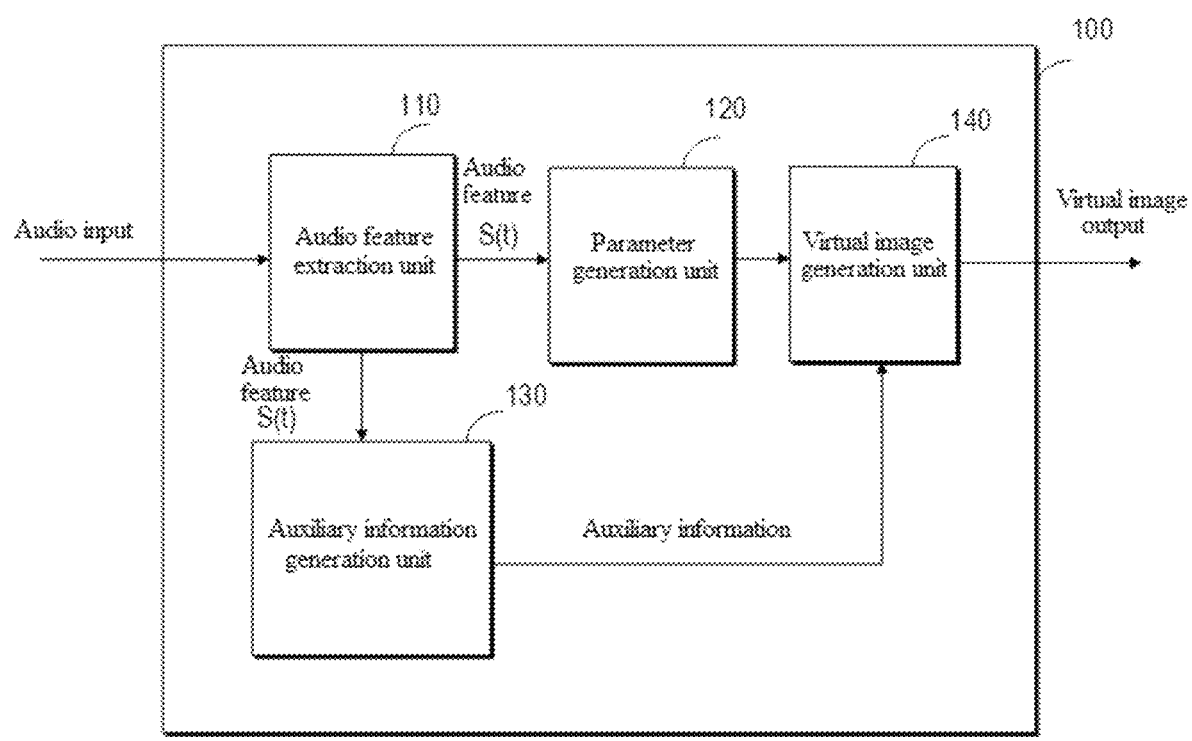
FIG. 1 illustrates a schematic diagram of an example electronic device in which the method according to embodiments of the present disclosure can be implemented.

Embodiments of the present disclosure will be further described in detail below in connection with the accompanying drawings, where FIG. 1 illustrates a schematic diagram of example electronic device 100 in which embodiments of the present disclosure can be implemented. Electronic device 100 may include, but is not limited to, mobile terminals such as a cell phone, a laptop computer, a digital radio receiver, a personal digital assistant (PDA), a portable Android device (PAD), a portable multimedia player (PMP), a vehicle-mounted terminal (such as a vehicle-mounted navigation terminal), and a wearable electronic device, as well as fixed terminals such as a digital TV, a desktop computer, and a smart home device. Electronic device 100 illustrated in FIG. 1 is only an example, it is not limited in the present disclosure, and example electronic device 100 should not impose any limitation to the functions and scope of use of embodiments of the present disclosure.

As shown in FIG. 1, example electronic device 100 includes audio feature extraction unit 110, parameter generation unit 120, auxiliary information generation unit 130, and virtual image generation unit 140. Audio feature extraction unit 110 may receive an audio input of a target object (e.g., a user) and process the received audio input to extract audio feature S(t) of the audio input, e.g., a Mel-frequency cepstral coefficient.

Parameter generation unit 120 may receive audio feature S(t) from audio feature extraction unit 110 and acquire an expression parameter and a pose parameter associated with the target object according to audio feature S(t), for example, acquiring an expression parameter and a pose parameter of the target object for use in virtual image generation.

In some embodiments, auxiliary information generation unit 130 may receive extracted audio feature S(t) from audio feature extraction unit 110, and process received audio feature S(t) to generate auxiliary information. In some embodiments, the auxiliary information includes a texture of at least a portion of the target object (for example, the texture may include a texture of a lower half of the face of the target object) and a geometric shape of at least a portion of the target object (for example, the geometric shape may include a 3D mesh of a three-dimensional set of vertices of the geometric shape of the face of the target object).

In some embodiments, virtual image generation unit 140 may receive the expression parameter and the pose parameter from parameter generation unit 120 as well as the auxiliary information from auxiliary information generation unit 130, and generate a virtual image and output the virtual image for subsequent applications, which will be further described below.

Audio feature extraction unit 110, parameter generation unit 120, auxiliary information generation unit 130, and virtual image generation unit 140 shown in FIG. 1 may be implemented as software components executed on one or more general-purpose processors, or implemented as hardware such as programmable logic devices and/or specialized integrated circuits that perform certain functions or combinations thereof. In some embodiments, these units may be embodied in the form of software products, where the software products may be stored in non-volatile storage media that include instructions causing an electronic device to implement a method described in embodiments of the present disclosure. In some embodiments, the modules described above may also be implemented on a single device, or may be distributed across multiple devices. The functions of these units may be combined with each other or further split into multiple sub-units, which is not limited in the present disclosure.

Electronic device 100 receives the audio input, performs feature extraction on the audio input, and based on the extracted audio feature, obtains the expression parameter and pose parameter needed to generate a virtual image. In this way, a user can obtain a corresponding virtual image without starting an image capture device, so that the user does not need to purchase or configure costly hardware apparatuses, thus reducing the user's cost of use. Moreover, in the case of generating a virtual image based on audio, electronic device 100 does not need to process video streams, thus improving the processing speed of electronic device 100 and reducing the computational cost. In addition, the auxiliary information acquired by electronic device 100 through the use of the audio feature of the audio input may also make the matching degree between the generated virtual image and the target object higher in terms of, for example, expression and pose, thus improving the generation effect and accuracy of the virtual image and further enhancing the user experience.

Figure 2:
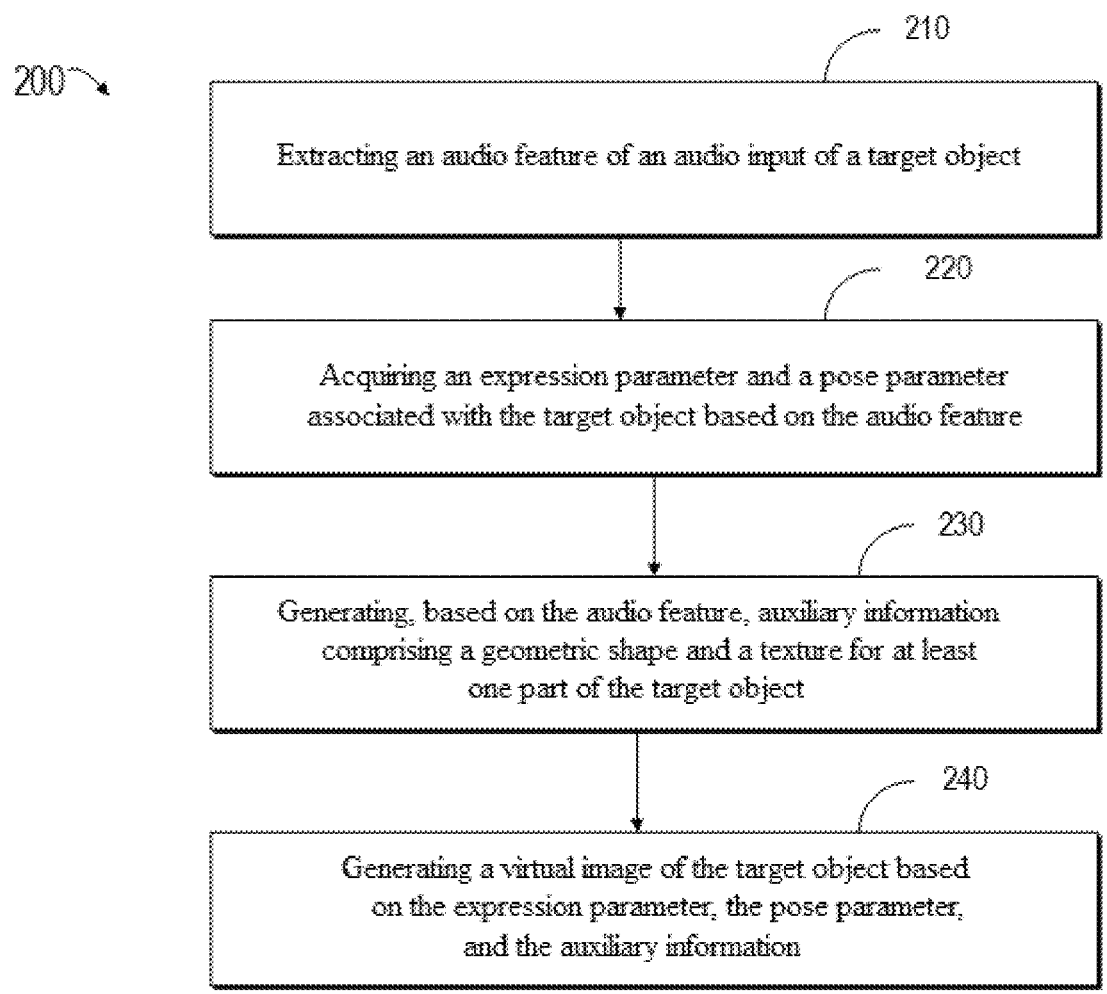
FIG. 2 illustrates example flow chart of a method for generating a virtual image according to an embodiment of the present disclosure.

FIG. 2 illustrates a schematic flow chart of method 200 for generating a virtual image according to an embodiment of the present disclosure. Method 200 shown in FIG. 2 may be implemented by electronic device 100 shown in FIG. 1.

As shown in FIG. 2, at block 210, electronic device 100 may extract audio feature S(t) of an audio input of a target object. In some embodiments, audio feature S(t) may include a Mel-frequency cepstral coefficient (MFCC). Audio feature extraction unit 110 in electronic device 100 may extract audio feature S(t) of the audio input of the target object. Audio feature extraction unit 110 may use known audio feature extraction techniques and audio feature extraction techniques to be developed in the future to extract audio feature S(t) from the audio input, and the present disclosure does not limit specific audio feature extraction techniques.

At block 220, electronic device 100 may acquire an expression parameter and a pose parameter associated with the target object based on the audio feature. In some embodiments, parameter generation unit 120 in electronic device 100 may process S(t) and obtain the expression parameter and the pose parameter associated with the target object based on audio feature S(t). For example, parameter generation unit 120 may use techniques such as a 3D morphable model (3DMM) to model the expression parameter and the pose parameter based on audio feature S(t) to obtain the expression parameter and the pose parameter associated with the target object. In some embodiments, the expression parameter may represent expressions of the target object, such as smiling and squinting. The pose parameter may represent a pose of the target object such as a pose of the head, such as a pose of head tilt. In one embodiment, the audio input includes a voice of the target object. It will be understood that when the target object, such as a user, is speaking, the voice of the target object is related to the expression and the pose of the target object, and in particular the movement of the lower part of the target object's face, such as lips.

In some embodiments, parameter generation unit 120 may be implemented by a long short-term memory (LSTM) network. An LSTM network is a recurrent neural network (RNN), and it overcomes the problem of gradient disappearance encountered in RNNs by using multiplicative gates and prevents content of the memory from being affected by irrelevant inputs and outputs, thus allowing long-term memory storage. In embodiments of the present disclosure, the LSTM network may be trained so that the expression parameter and the pose parameter associated with the target object are acquired via the trained LSTM network based on the audio feature. The training process of LSTM according to an embodiment of the present disclosure will be described specifically below.

In some embodiments, LSTM may be trained by electronic device 100 or other electronic devices, which is not limited in the present disclosure. For the sake of brevity, devices for training LSTM are hereinafter uniformly referred to as training devices.

In some embodiments, the LSTM network may be denoted by R. With the trained LSTM network, a set of expression parameters obtained based on the audio feature may be defined as $\tilde{\beta}=\{\tilde{\beta}^{(1)}, \ldots, \tilde{\beta}^{(T)}\}$, and a set of pose parameters obtained based on the audio feature may be defined as $\tilde{\rho}=\{\tilde{\rho}^{(1)}, \ldots, \tilde{\rho}^{(T)}\}$. As a result, a mapping relationship between the input audio feature and the output expression parameter and pose parameter may be obtained, as shown in Equation 1:

$$[\tilde{\beta}^{(t)}, \tilde{\rho}^{(t)}, h^{(t)}, c^{(t)}] = R(E(s^{(t)}), h^{(t-1)}, c^{(t-1)}) \quad \text{(Equation 1)}$$

where E denotes a decoder applied to audio feature S(t), and $h^{(t)}$, $c^{(t)}$ denote the hidden state and the unit state of LSTM at moment t, respectively.

In some embodiments, the training device may receive the set of sample audio features $S(i)=\{s^{(1)}, \ldots, s^{(T)}\}$, the set of true values $\beta=\{\beta^{(1)}, \ldots, \beta^{(T)}\}$ of the expression parameter, and the set of true values $\rho=\{\rho^{(1)}, \ldots, \rho^{(T)}\}$ of the pose parameter. The training device may construct a training loss function (such as Equation 2) and obtain a trained LSTM network by minimizing the loss function:

$$\mathcal{L}(R, E) = \mathbb{E}_{s,\beta}\left[(\beta - \phi_1(s))^2\right] + \quad \text{(Equation 2)}$$

$$\lambda_1 \mathbb{E}_{s,\rho}\left[(\rho - \phi_2(s))^2\right] + \lambda_2 \mathbb{E}_s\left[\sum_{t=0}^{T-1}(\phi_2(s)^{(t+1)} - \phi_2(s)^{(t)})^2\right] +$$

-continued $$\lambda_3 \mathbb{E}_s\left[\sum_{t=0}^{T-1}(\phi_1(s)^{(t+1)} - \phi_1(s)^{(t)})^2\right]$$

where $\tilde{\beta}=\phi_1(s)$, $\tilde{\rho}=\phi_2(s)$, and $\lambda_1$, $\lambda_2$, and $\lambda_3$ may be parameter values that are set by a user empirically, which is not limited in the present disclosure. By minimizing the above loss function, i.e., minimizing the sum of the following items: the mean squared difference between true values and predicted values of the expression parameter; the mean squared difference between true values and predicted values of the pose parameter; the sum of mean squared differences of predicted values of the expression parameter at every two successive moments t and (t+1) during predetermined time T; and the sum of mean squared differences of predicted values of the pose parameter at every two successive moments t and (t+1) during predetermined time T, the trained LSTM network can be obtained.

In the above manner, the training device trains LSTM, and obtains a trained LSTM in such a way that the loss function as in Equation 2 is minimized. In addition, the training device may also train LSTM based on the number of iterations and, for example, when the number of iterations satisfies a predetermined value, a trained LSTM can be obtained. The condition for terminating the training is not limited in the present disclosure. It should be understood that the training termination condition may be set according to actual requirements and application needs, and when the training termination condition is satisfied, the training can be terminated, and a trained LSTM network can be obtained. In this way, during the prediction process, the expression parameter and the pose parameter associated with the target object can be generated based on received audio feature S(t) from audio feature extraction unit 110.

Still referring to FIG. 2, method 200 for generating a virtual image according to an embodiment of the present disclosure is described. As shown in FIG. 2, in block 230, electronic device 100 may generate, based on the audio feature, auxiliary information comprising a geometric shape and a texture for at least one part or other portion of the target object. In some embodiments, the geometric shape of at least one part or other portion of the target object may include, for example, a 3D mesh of a three-dimensional set of vertices of the geometric shape of the face of the target object, and the texture for at least one part or other portion of the target object may include a set of textures of the lower part of the face of the target object.

Figure 3:
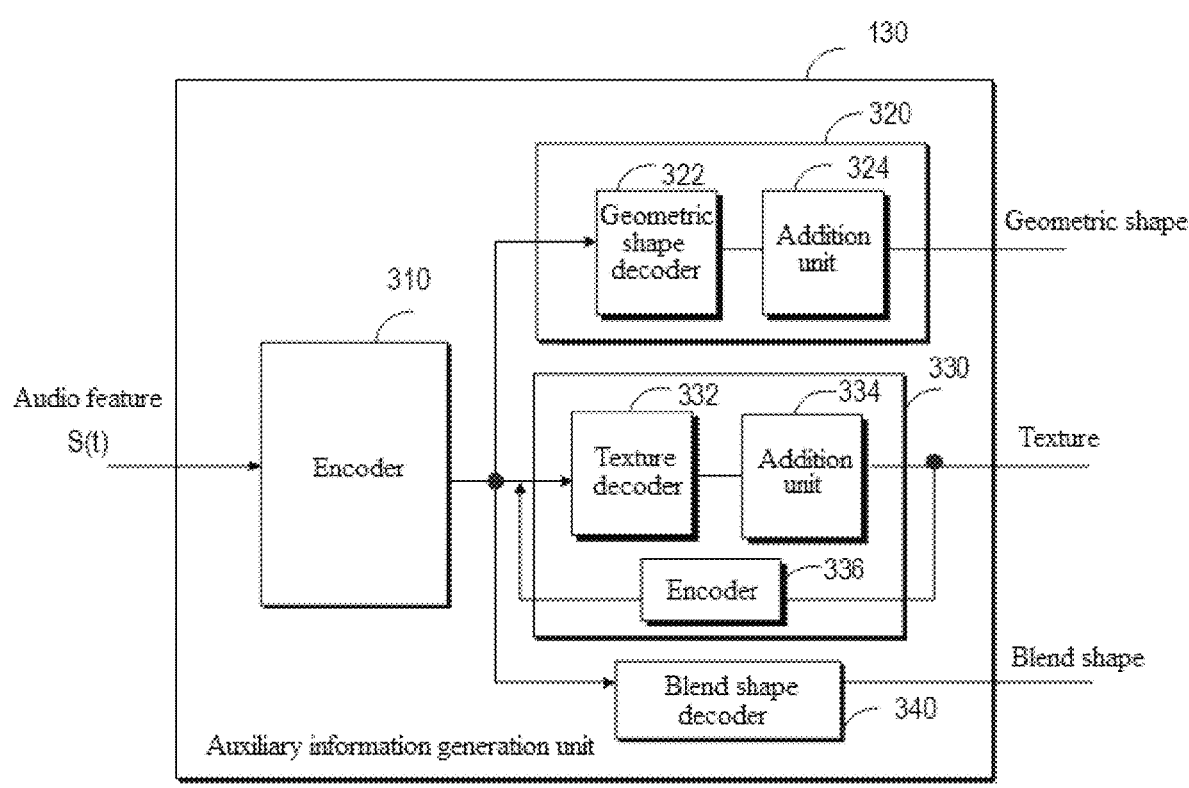
FIG. 3 illustrates a schematic block diagram of the detailed structure of an auxiliary information generation unit in an electronic device according to an embodiment of the present disclosure.
Figure 4:
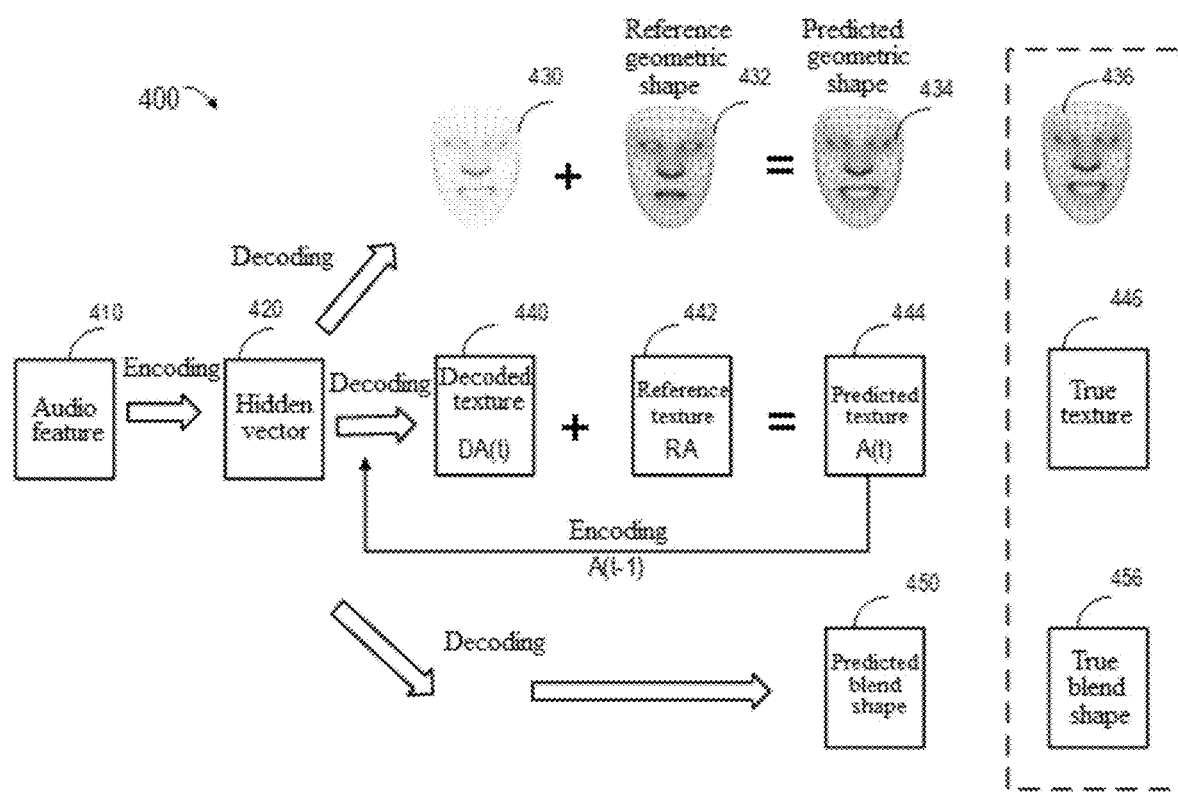
FIG. 4 illustrates a diagram of an example process for processing an audio feature according to an embodiment of the present disclosure.

In some embodiments, the auxiliary information may be generated by auxiliary information generation unit 130 in electronic device 100 based on the audio feature. Hereinafter, the process of generating auxiliary information will be described in detail in connection with FIG. 3 and FIG. 4. Here, FIG. 3 illustrates a schematic block diagram of auxiliary information generation unit 130 according to an embodiment of the present disclosure, and FIG. 4 illustrates a schematic process 400 for the generation of auxiliary information according to an embodiment of the present disclosure. It will be understood that the block diagram and the process diagram in FIG. 3 and FIG. 4 are only schematic examples.

In some embodiments, auxiliary information generation unit 130 encodes the audio feature to obtain hidden vector $L_t^s \in \mathbb{R}^{N_s}$ characterizing audio feature S(t). For example, as shown in FIG. 3, auxiliary information generation unit 130 may include encoder 310, where encoder 310 encodes audio feature S(t) 410 to obtain hidden vector 420, as shown in FIG. 4. In some embodiments, encoder 310 may be implemented using a neural network. For example, the neural network may include multiple (e.g., 12) convolutional layers as well as one Rectified Linear Unit (ReLU) activation layer. Taking a neural network including 12 convolutional layers as an example, the first 6 layers of the 12 convolutional layers may perform one-dimensional frequency convolution on audio feature S(t) 410, the next 6 convolutional layers perform a one-dimensional temporal convolution operation on the output of the first 6 layers, and the activation function ReLU corresponds to morpheme detection and activation, thus generating hidden vector 420.

In some embodiments, auxiliary information generation unit 130 may generate the auxiliary information for the target object based on the hidden vector. For example, auxiliary information generation unit 130 may generate the geometric shape for at least one part of the target object based on the hidden vector. Hereinafter, a specific description will be provided in connection with FIG. 3 and FIG. 4.

As shown in FIG. 4 and in connection with FIG. 3, auxiliary information generation unit 130 may perform a decoding operation on hidden vector 420 to generate decoded geometric shape 430. Auxiliary information generation unit 130 further performs an overlay operation on decoded geometric shape 430 generated through decoding and reference geometric shape 432 to obtain predicted geometric shape 434, which is a geometric shape for at least one part of the target object. In some embodiments, auxiliary information generation unit 130 may include geometric shape generation unit 320, and as shown in FIG. 3, geometric shape generation unit 320 includes geometric shape decoder 322 and addition unit 324, where geometric shape decoder 322 may decode hidden vector 420 output from encoder 310 to generate a decoded geometric shape, as shown by decoded geometric shape 430 in FIG. 4. Addition unit 324 overlays decoded geometric shape 430 from geometric shape decoder 322 and reference geometric shape 432 to obtain predicted geometric shape 434 for at least one part of the target object, as shown in FIG. 4. This example is illustrated with a 3D mesh of the face as an example, and it can be understood that, depending on specifics of the virtual image that needs to be generated, other geometric shapes for other parts of the target object are used, which is not limited in the present disclosure.

In some embodiments, geometric shape decoder 322 as shown in FIG. 3 may be implemented using a neural network. The neural network may include multiple, e.g., two, fully connected layers having multiple (e.g., 150) cells and (e.g., 1404) cells, respectively, for use in performing full connectivity operations on received hidden vector 420, and this network may also include an activation layer having a drop-out layer for preventing over-fitting. By using this network, a 3D mesh with 468 vertices per dimension can be obtained based on audio feature S(t). The structure of the above neural network is only an example, and geometric shape decoder 322 may also be implemented by neural networks of other structures to process audio feature S(t) to obtain the decoded geometric shape, which is not limited in the present disclosure.

In addition, in some embodiments, auxiliary information generation unit 130 may also generate the auxiliary information based on hidden vector 420. For example, auxiliary information generation unit 130 may also generate the texture for at least a portion of the target object based on hidden vector 420. Hereinafter, the method for generating a texture will continue to be described in detail in connection with FIG. 3 and FIG. 4.

For example, auxiliary information generation unit 130 may perform a decoding operation on hidden vector 420 to generate decoded texture 440; and auxiliary information generation unit 130 further performs an overlay operation on generated decoded texture 440 and reference texture 442 to obtain predicted texture 444, which is a texture for at least one part of the target object. In some embodiments, auxiliary information generation unit 130 may include texture generation unit 330, and as shown in FIG. 3, texture generation unit 330 may include texture decoder 332 and addition unit 334, where texture decoder 332 may be used to decode hidden vector 420 output from encoder 310 to generate decoded texture 440, as shown by decoded texture 440 in FIG. 4. Addition unit 334 may overlay decoded texture 440 from texture decoder 332 and reference texture 442 to obtain predicted texture 444 for the target object, as shown in FIG. 4. In some embodiments, examples of the texture may include a set of textures of the lower half of the face of the target object. It can be understood that other textures for the target object may be used depending on specifics of the virtual image that needs to be generated, which is not limited in the present disclosure.

In addition, in some embodiments, the texture may include temporal correlation information. That is, the texture at the current moment may be associated with the texture at a previous moment (e.g., a preceding moment). As shown in FIG. 3, texture generation unit 330 may also include encoder 336, and encoder 336 receives a texture generated by texture generation unit 330 at a previous moment (e.g., a preceding moment), encodes the texture, and inputs the encoded texture to texture decoder 332, such that texture decoder 332 may generate a decoded texture at the current moment based on the hidden vector and the previous texture obtained for the target object at the previous moment, and further, addition unit 334 may overlay the decoded texture at the current moment and a reference texture to generate the texture at the current moment. Specifically, as shown in FIG. 3 and FIG. 4, encoder 336 in texture generation unit 330 may receive, for example, texture A(t−1) at moment (t−1) previous to current moment t output by texture generation unit 330 and encode texture A(t−1), such that texture decoder 332 may generate decoded texture DA(t) at current moment t based on the hidden vector and texture A(t−1) at this previous moment, and addition unit 334 may overlay decoded texture DA(t) at current moment t and reference texture RA to generate texture A(t) at current moment t for the target object. Since the texture changes slightly during successive moments when a user is speaking, the temporal continuity of the generated texture information can be improved by correlating the texture information in the temporal sequence, so that it is possible to improve temporal sustainability and continuity effect of the generated virtual image and further improve the generation effect of the virtual image, which can thus enhance the user experience.

In some embodiments, texture decoder 332 may also be implemented by a neural network. In some embodiments, this neural network may include a fully connected layer for distributing the hidden vector over space. The neural network may also include an upsampling layer that may generate, for example, 128×128 texture data through the use of a convolutional interpolation operation. It can be understood that texture decoder 332 may also be implemented by employing neural networks of other types and structures, which is not limited in the present disclosure.

In some embodiments, the reference geometric shape and the reference texture used in auxiliary information generation unit 130 may be acquired according to a material to be rendered. For example, when a user chooses to render based on cartoon image C to generate a virtual image, the corresponding geometric shape and reference texture are the corresponding geometric shape and texture for that cartoon image C.

In addition, in order to make the generated virtual image more vivid, embodiments according to the present disclosure may also include generating a predicted blend shape based on the hidden vector. For example, in some embodiments, auxiliary information generation unit 130 may generate a blend shape for the target object based on the hidden vector. For example, auxiliary information generation unit 130 may include blend shape decoder 340, and as shown in FIG. 3, blend shape decoder 340 may generate predicted blend shape 450 for the target object based on hidden vector 420. In some embodiments, the vertices of the blend shape match the vertices of the geometric shape generated in geometric shape generation unit 320.

In some embodiments, trained geometric shape generation unit 320 may be obtained through training. For example, during training, as shown in FIG. 4, the loss function consisting of predicted geometric shape $\hat{V}_t$ 434 and true geometric shape 436 $V_t$ can be minimized, and the loss function may be defined as, for example: $R_{geo} = \|V_t - \hat{V}_t\|_2$. In addition, other loss functions may also be defined to train geometric shape generation unit 320.

In some embodiments, trained texture generation unit 330 may be obtained through training. For example, during training, as shown in FIG. 4, the loss function consisting of predicted texture $\hat{A}_t$ 444 and true texture $A_t$ 446 can be minimized, and the loss function may be defined as, for example: $R_{tex} = d(A_t, \hat{A}_t)$, where d denotes a visual distance measure. In addition, other loss functions may also be defined to train texture generation unit 330.

Similarly, electronic device 100 may also obtain trained blend shape decoder 340 through a training process. For example, the loss function consisting of predicted blend shape $\hat{B}_t$ 450 and true blend shape $B_t$ 456 can be minimized, and the loss function may be defined as, for example: $R_{bs} = \|B_t - \hat{B}_t\|_1$. In addition, other loss functions may also be defined to train blend shape decoder 340.

In addition, in some embodiments, sample blend shape $B_t$ used in training the blend shape decoder matches sample geometric shape information $V_t$ used in training the geometric shape generation unit, that is, electronic device 100 may retrieve sample blend shape $B_t$ in a storage database that matches the vertices of sample geometric shape information $V_t$ based on the vertices in sample geometric shape information, $V_t$ thereby making the vertices of the blend shape match the vertices of the geometric shape, which in turn enhances the effect of the generated virtual image, thereby further improving the user experience.

Returning to FIG. 2, in block 240, electronic device 100 may generate a virtual image for the target object based on the expression parameter, the pose parameter, and the auxiliary information. As shown in FIG. 1, electronic device 100 may include virtual image generation unit 140, and virtual image generation unit 140 may render a material to be rendered based on the acquired expression parameter, pose parameter, and auxiliary information, so as to obtain the generated virtual image. The rendering process may be performed using rendering techniques that are known or to be developed in the future, which is not limited in the present disclosure.

In the above, method 200 for generating a virtual image according to embodiments of the present disclosure has been described in connection with FIG. 2 through FIG. 4. With the above method, electronic device 100 receives the audio input, performs feature extraction on the audio input, and based on the extracted audio feature, obtains the expression parameter and pose parameter needed to generate a virtual image. In this way, a user can obtain a corresponding virtual image without starting an image capture device, so that the user does not need to purchase or configure costly hardware apparatuses, thus reducing the user's cost of use. Moreover, in the case of generating a virtual image based on audio, electronic device 100 does not need to process video streams, thus improving the processing speed of electronic device 100 and reducing the computational cost. In addition, the auxiliary information acquired by electronic device 100 through the use of the audio feature of the audio input may also make the matching degree between the generated virtual image and the target object higher in terms of, for example, expression and pose, thus improving the generation effect of the virtual image and further enhancing the user experience.

In some embodiments, in order to further enhance the effect of the generated virtual image, electronic device 100 may also receive videos including the target object and process the videos to obtain information such as texture information and geometric shape information for the target object, lighting information for the target object, and the expression and pose of the target object, and overlay or weight the information with the information obtained based on audio for further use in rendering a material to be rendered, so as to generate a virtual image with a more realistic effect.

In some embodiments, the generated virtual image may be applied to various application scenarios, e.g., game scenarios, teleconferencing scenarios, etc. For example, electronic device 100 may provide an input interface (not shown in the figures, e.g., a graphical user interface (GUI) or an input device such as a mouse and a keyboard), and when a user input is received via the input interface (e.g., through mouse clicks or touch operations), electronic device 100 may, based on the user's instructions, place the generated virtual image in a virtual scene displayed through a display of the electronic device and display the virtual scene to which the virtual image has been added. In addition, the user may also adjust the orientation, movement, etc., of the virtual image in the virtual scene via the input interface, so that the user can achieve movement in the virtual scene similar to that in a real scene and further obtain a more enhanced experience.

Figure 5A:
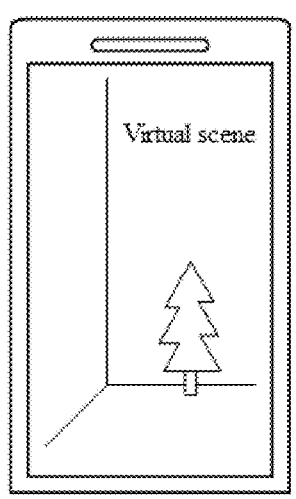
FIGS. 5A through 5C illustrate schematic diagrams of an application scenario of a method for generating a virtual image according to embodiments of the present disclosure.
Figure 5B:
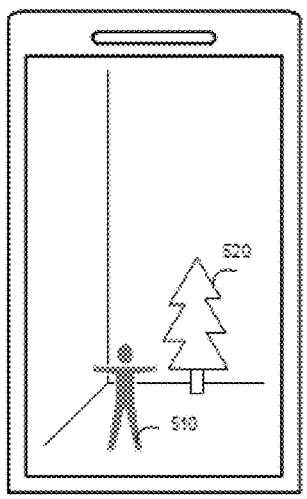
Figure 5C:
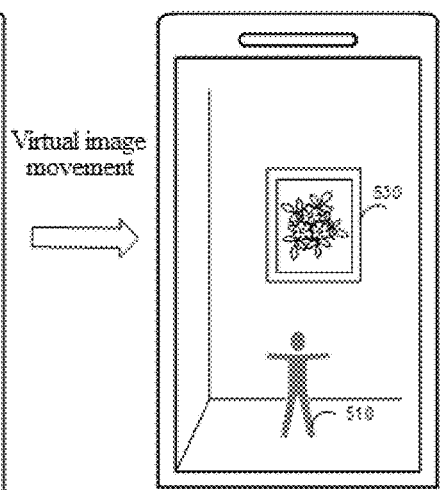

FIGS. 5A through 5C illustrate schematic diagrams of an application scenario of the generated virtual image. The user may place generated virtual image 510 in the virtual scene of FIG. 5A through the input interface of electronic device 100, as shown by the virtual scene to which the virtual image has been added in FIG. 5B. In addition, the user may also adjust the movement, orientation, etc., of generated virtual image 510 in the virtual scene via the input interface, so that electronic device 100 can display the view angle direction of generated virtual image 510 after the movement to the user via the display. For example, a first view angle of the virtual image can be presented in the display, e.g., in the direct view direction, as shown in FIG. 5C. For example, after the movement of the virtual image in the virtual scene, the virtual image may be adjusted from facing plant 520 in FIG. 5B to facing drawing 530 in FIG. 5C, thereby enhancing the user's interaction experience. It should be understood that FIGS. 5A through 5C are merely schematic and do not limit the scope of the present disclosure.

Figure 6:
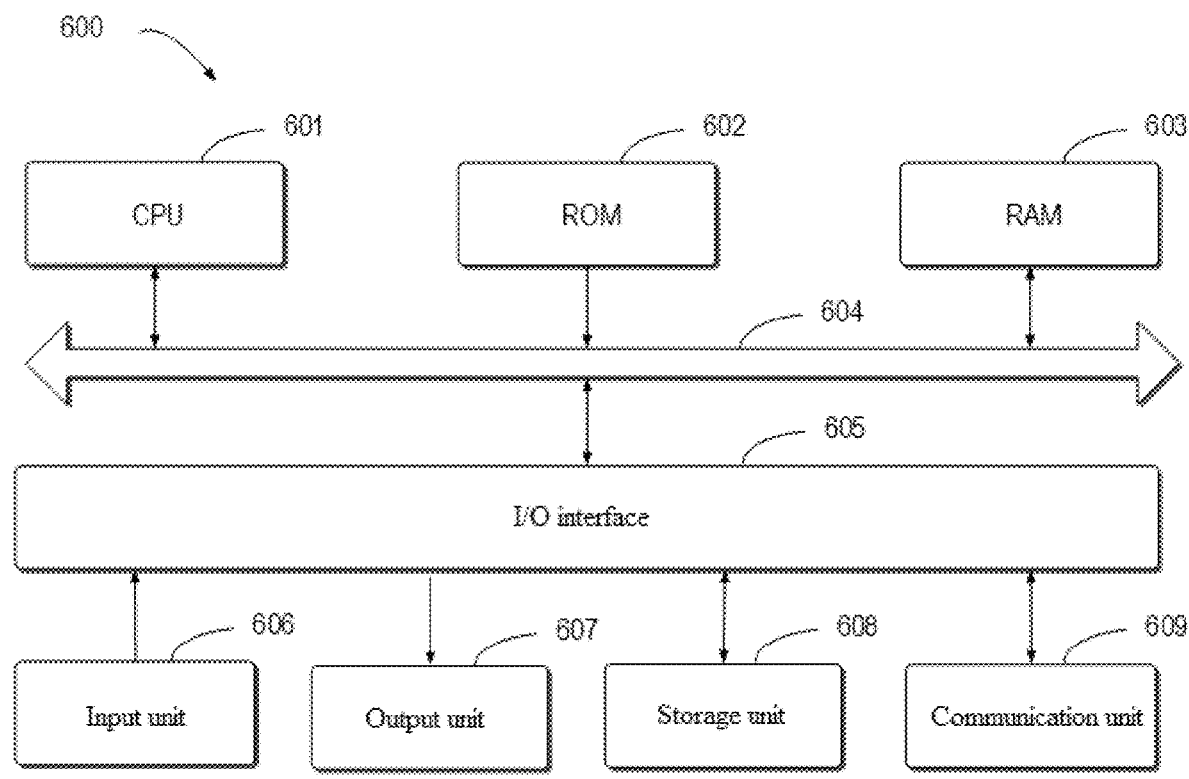
FIG. 6 illustrates a schematic block diagram of an example device suitable for implementing embodiments of the present disclosure according to embodiments of the present disclosure.

FIG. 6 illustrates a schematic block diagram of example device 600 that may be used to implement embodiments of the present disclosure. For example, electronic device 100 in FIG. 1 may be implemented using device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as method 200, may be performed by CPU 601. For example, in some embodiments, method 200 may be implemented as a computer software program that is tangibly included in a machine-readable medium, such as storage unit 608. In some embodiments, part of or all the computer program may be loaded and/or installed onto device 600 via ROM 602 and/or communication unit 609. One or more actions of method 200 described above may be performed when the computer program is loaded into RAM 603 and executed by CPU 601.

Example embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible embodiments of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative embodiments, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented by using a combination of special hardware and computer instructions.

Example embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method comprising:
   extracting an audio feature of an audio input of a target object;
   acquiring an expression parameter and a pose parameter associated with the target object based on the audio feature;
   generating, based on the audio feature, auxiliary information comprising a texture for at least a portion of the target object and a geometric shape of at least a portion of the target object; and
   generating a virtual image of the target object based on the expression parameter, the pose parameter, and the auxiliary information;
   wherein generating, based on the audio feature, the auxiliary information comprising the texture and the geometric shape comprises applying the audio feature to an audio encoder and applying a same hidden vector from an output of the audio encoder to respective inputs of each of a texture decoder and a geometric shape decoder, each of the texture decoder and the geometric shape decoder decoding the same hidden vector from the output of the audio encoder, the texture and the geometric shape being generated as respective outputs of respective distinct processor-implemented addition units having inputs coupled to respective outputs of the texture decoder and the geometric shape decoder, the addition units combining respective distinct decoded versions of the same hidden vector as determined by the texture decoder and the geometric shape decoder with respective distinct first and second references.

2. The method according to claim 1, wherein generating the auxiliary information comprises:
   encoding the audio feature to obtain the hidden vector characterizing the audio feature;
   generating the geometric shape for at least a portion of the target object based on the hidden vector; and
   generating the texture based on the hidden vector.

3. The method according to claim 2, wherein generating the geometric shape for at least a portion of the target object based on the hidden vector comprises:
   decoding the hidden vector to generate a decoded geometric shape; and
   overlaying the decoded geometric shape with a reference geometric shape to generate the geometric shape for at least a portion of the target object.

4. The method according to claim 2, wherein generating the texture based on the hidden vector comprises:
   generating a decoded texture based on the hidden vector; and
   overlaying the decoded texture with a reference texture to generate the texture.

5. The method according to claim 2, wherein the texture comprises temporal correlation information.

6. The method according to claim 2, wherein generating the texture based on the hidden vector comprises:
   generating a decoded texture at a current moment based on the hidden vector and a previous texture for at least a portion of the target object obtained at a previous moment; and
   overlaying the decoded texture at the current moment with a reference texture to generate a texture for at least a portion of the target object at the current moment.

7. The method according to claim 2, wherein the auxiliary information further comprises a blend shape for the target object, and the method further comprises:
   generating the blend shape based on the hidden vector.

8. The method according to claim 7, wherein the blend shape is generated by a blend shape decoder, the geometric shape is generated by a geometric shape generation unit, and a sample blend shape used in training the blend shape decoder matches sample geometric shape information used in training the geometric shape generation unit.

9. The method according to claim 1, wherein the expression parameter and the pose parameter associated with the target object are acquired by a long short-term memory (LSTM) network based on the audio feature, and the audio feature comprises a Mel-frequency cepstral coefficient.

10. The method according to claim 9, wherein the LSTM network is obtained through training, and the LSTM network is trained such that a weighted sum of the following items is minimized: the mean squared difference between true values and predicted values of the expression parameter; the mean squared difference between true values and predicted values of the pose parameter; the sum of mean squared differences of predicted values of the expression parameter at every two successive moments during a predetermined time; and the sum of mean squared differences of predicted values of the pose parameter at every two successive moments during the predetermined time.

11. The method according to claim 1, further comprising:
setting the generated virtual image in a virtual scene in response to receiving a user input; and
displaying the set virtual scene.

12. An electronic device, comprising:
at least one processor; and
a memory coupled to the at least one processor and having instructions stored therein, wherein the instructions, when executed by the at least one processor, cause the electronic device to perform actions comprising:
extracting an audio feature of an audio input of a target object;
acquiring an expression parameter and a pose parameter associated with the target object based on the audio feature;
generating, based on the audio feature, auxiliary information comprising a texture for at least a portion of the target object and a geometric shape of at least a portion of the target object; and
generating a virtual image of the target object based on the expression parameter, the pose parameter, and the auxiliary information;
wherein generating, based on the audio feature, the auxiliary information comprising the texture and the geometric shape comprises applying the audio feature to an audio encoder and applying a same hidden vector from an output of the audio encoder to respective inputs of each of a texture decoder and a geometric shape decoder, each of the texture decoder and the geometric shape decoder decoding the same hidden vector from the output of the audio encoder, the texture and the geometric shape being generated as respective outputs of respective distinct processor-implemented addition units having inputs coupled to respective outputs of the texture decoder and the geometric shape decoder, the addition units combining respective distinct decoded versions of the same hidden vector as determined by the texture decoder and the geometric shape decoder with respective distinct first and second references.

13. The electronic device according to claim 12, wherein generating the auxiliary information comprises:
encoding the audio feature to obtain the hidden vector characterizing the audio feature;
generating the geometric shape for at least a portion of the target object based on the hidden vector; and
generating the texture based on the hidden vector.

14. The electronic device according to claim 13, wherein generating the geometric shape for at least a portion of the target object based on the hidden vector comprises:
decoding the hidden vector to generate a decoded geometric shape; and
overlaying the decoded geometric shape with a reference geometric shape to generate the geometric shape for at least a portion of the target object.

15. The electronic device according to claim 13, wherein generating the texture based on the hidden vector comprises:
generating a decoded texture based on the hidden vector; and
overlaying the decoded texture with a reference texture to generate the texture;
wherein the texture comprises temporal correlation information.

16. The electronic device according to claim 13, wherein generating the texture based on the hidden vector comprises:
generating a decoded texture at a current moment based on the hidden vector and a previous texture for at least a portion of the target object obtained at a previous moment; and
overlaying the decoded texture at the current moment with a reference texture to generate a texture for at least a portion of the target object at the current moment.

17. The electronic device according to claim 13, wherein the auxiliary information further comprises a blend shape for the target object, and the actions further comprise:
generating the blend shape based on the hidden vector.

18. The electronic device according to claim 12, wherein the expression parameter and the pose parameter associated with the target object are acquired by a long short-term memory (LSTM) network based on the audio feature, and the audio feature comprises a Mel-frequency cepstral coefficient.

19. The electronic device according to claim 18, wherein the LSTM network is obtained through training, and the LSTM network is trained such that a weighted sum of the following items is minimized: the mean squared difference between true values and predicted values of the expression parameter; the mean squared difference between true values and predicted values of the pose parameter; the sum of mean squared differences of predicted values of the expression parameter at every two successive moments during a predetermined time; and the sum of mean squared differences of predicted values of the pose parameter at every two successive moments during the predetermined time.

20. A computer program product tangibly stored on a non-transitory computer-readable medium and including machine-executable instructions, wherein the machine-executable instructions, when executed by a machine, cause the machine to perform actions comprising:
extracting an audio feature of an audio input of a target object;
acquiring an expression parameter and a pose parameter associated with the target object based on the audio feature;
generating, based on the audio feature, auxiliary information comprising a texture for at least a portion of the target object and a geometric shape of at least a portion of the target object; and
generating a virtual image of the target object based on the expression parameter, the pose parameter, and the auxiliary information;
wherein generating, based on the audio feature, the auxiliary information comprising the texture and the geometric shape comprises applying the audio feature to an audio encoder and applying a same hidden vector from an output of the audio encoder to respective inputs of each of a texture decoder and a geometric shape decoder, each of the texture decoder and the geometric shape decoder decoding the same hidden vector from the output of the audio encoder, the texture and the geometric shape being generated as respective outputs of respective distinct processor-implemented addition units having inputs coupled to respective outputs of the texture decoder and the geometric shape decoder, the addition units combining respective distinct decoded versions of the same hidden vector as determined by the texture decoder and the geometric shape decoder with respective distinct first and second references.

* * * * *